US010676177B1

(12) United States Patent
Costello et al.

(10) Patent No.: US 10,676,177 B1
(45) Date of Patent: Jun. 9, 2020

(54) ROBOTIC LANDING GEAR FOR ROTORCRAFT

(71) Applicant: Earthly Dynamics, LLC, Atlanta, GA (US)

(72) Inventors: Mark F. Costello, Atlanta, GA (US); Michael Brian Ward, Atlanta, GA (US); R Matthew Tallent, McLean, VA (US); Ryan Hofmeister, Arlington, VA (US); Ashish Bagai, Vienna, VA (US)

(*) Notice: Subject to any disclaimer, the term of this patent is extended or adjusted under 35 U.S.C. 154(b) by 391 days.

(21) Appl. No.: 15/166,463

(22) Filed: May 27, 2016

Related U.S. Application Data

(60) Provisional application No. 62/168,173, filed on May 29, 2015.

(51) Int. Cl.
*B64C 25/00* (2006.01)
*B64C 25/32* (2006.01)

(52) U.S. Cl.
CPC .......... *B64C 25/001* (2013.01); *B64C 25/32* (2013.01); *B64C 2025/008* (2013.01); *B64C 2025/325* (2013.01)

(58) Field of Classification Search
CPC ........ B64C 2025/006; B64C 2025/008; B64C 2025/325; B64C 25/00; B64C 25/10; B64C 25/08; B64C 25/18; B64C 25/32; B64C 25/50; B64C 25/66; B64C 2201/18
See application file for complete search history.

(56) References Cited

U.S. PATENT DOCUMENTS

| 2,927,747 | A | * | 3/1960 | Bennie | B64C 25/52 244/17.17 |
| 3,173,632 | A | * | 3/1965 | Woods | B64C 25/52 244/100 R |
| 3,175,789 | A | * | 3/1965 | Blumrich | B64G 1/62 188/268 |
| 4,870,904 | A | * | 10/1989 | Picot | F42B 23/24 102/383 |
| 6,922,610 | B2 | * | 7/2005 | Okamoto | B25J 9/06 219/121.74 |
| 9,033,276 | B1 | * | 5/2015 | Calvert | B64C 25/10 244/102 R |

(Continued)

FOREIGN PATENT DOCUMENTS

GB 834678 A * 5/1960 ............. B64C 25/10

OTHER PUBLICATIONS

Rotorcraft Slope Landings with Articulated Landing Gear, Manivannan et al., American Institute of Aeronautics and Astronautics Atmospheric Flight Mechanics Conference, Aug. 21, 2013, Boston, MA.

*Primary Examiner* — Jessica B Wong
(74) *Attorney, Agent, or Firm* — Moore, Ingram, Johnson & Steele

(57) ABSTRACT

The present invention relates to robotic landing gear for a rotorcraft that is designed to allow for landing on sloped and irregular surfaces. The robotic landing gear consists of articulated legs with contact sensors. Once the contact sensor touches a landing surface, the articulated leg in which contact is detected retracts to maintain a certain amount of contact pressure with the surface. Each articulated leg does this independently until contact is detected on the sensors of all of the robotic legs, at which point the legs lock in position and the rotorcraft can safely land.

16 Claims, 5 Drawing Sheets

(56) References Cited

U.S. PATENT DOCUMENTS

| | | | | |
|---|---|---|---|---|
| 9,592,908 B2* | 3/2017 | Gentry | ................... | B64C 25/10 |
| 2003/0208303 A1* | 11/2003 | Okamoto | ................... | B25J 9/06 |
| | | | | 700/245 |
| 2008/0098873 A1* | 5/2008 | Kitagawa | ............... | G10H 1/348 |
| | | | | 84/422.1 |
| 2010/0252678 A1* | 10/2010 | Luce | ....................... | B64C 25/00 |
| | | | | 244/100 R |
| 2011/0278394 A1* | 11/2011 | Ditzler | ................... | B64C 25/26 |
| | | | | 244/102 SL |
| 2013/0094963 A1* | 4/2013 | Rolt | ...................... | B64D 27/02 |
| | | | | 416/1 |
| 2014/0249702 A1* | 9/2014 | Pflug | .................... | B64C 25/001 |
| | | | | 701/16 |
| 2016/0221669 A1* | 8/2016 | Didey | ................... | B64C 25/405 |

* cited by examiner

ROBOTIC LANDING GEAR FOR ROTORCRAFT

CROSS REFERENCE AND RELATED APPLICATIONS

The present application is a nonprovisional application claiming benefit of U.S. Provisional Application No. 62/168,173, filed May 29, 2015. The subject matter of that application is hereby incorporated in its entirety.

STATEMENT OF GOVERNMENT INTEREST

The work that lead to certain aspects of this invention was supported in part by the Defense Advanced Research Projects Agency (DARPA). Thus, the United States Government may have certain rights to this invention.

FIELD OF THE INVENTION

The present invention relates to robotic landing gear for a rotorcraft that is designed to allow for landing on sloped and irregular surfaces.

BACKGROUND OF THE INVENTION

Rotorcraft, or rotary-wing aircraft, have been used for accessing remote and/or unprepared areas unreachable by fixed-wing aircraft due to the rotorcraft's ability to perform vertical takeoffs and landings. However, current rotorcraft must observe strict slope limits for the ground surface to ensure safe takeoffs and landings. While the maximum slope requirement varies among rotorcraft, they are generally limited to surfaces with slopes from 6-15 degrees. There is currently a specific and complex maneuver that rotorcraft pilots must execute to prevent the aircraft from rolling over when operating from sloped terrain.

There have been many concepts presented to solve the slope landing problem. Many of these solutions operate on the same concept of landing one side of the rotorcraft gear on the ground and extending the opposite gear to achieve an approximately level surface. However, none of the proposed solutions have been shown to be effective and would not be useable on irregular terrain. Therefore, a rotorcraft with the ability to land on irregular terrain, sloped terrain, or moving objects, such as ships and ground vehicles is desired.

SUMMARY OF THE INVENTION

The present invention relates to robotic landing gear for a rotorcraft comprising articulated robotic legs that allow for landing on irregular terrain. The articulated robotic legs are attached to a frame that can support the weight of the rotorcraft. In a preferred embodiment, the robotic landing gear comprises two leg units that are attached to one another by two cross braces. Each leg unit further comprises a leg brace, wherein each end of the leg brace is attached to an articulated robotic leg. In a preferred embodiment, the cross braces are attached to each of the leg braces to form the frame to support the rotorcraft, however, alternative configurations may be used to support the frame, including eliminating the cross braces and creating an X shape with the leg braces. In a further preferred embodiment, the articulated robotic legs may be directly attached to the rotorcraft. The relaxed or nominal stance of the legs mimics that of the original skid geometry of the rotorcraft. The rotorcraft of the present invention may be manned or unmanned.

In a further embodiment, each articulated robotic leg comprises a hip joint, an upper leg segment, a knee joint, a lower leg segment and a foot. The articulated robotic leg is attached to the leg brace at the hip joint located at the top of the upper leg segment. The bottom of the upper leg segment and the top of the lower leg segment are connected by the knee joint. The foot is attached to the bottom of the lower leg segment. In a preferred embodiment, the hip joint and knee joint are hinge joints, however, it is understood that alternative joints may be used, including, but not limited to pivot joints, saddle joints or ball and socket joints.

In another preferred embodiment, each joint consists of an electrical actuator comprising a lightweight, high-torque brushless motor coupled to an electromagnetic power-off brake, however alternative actuation and braking systems may be used including, but not limited to pneumatic and hydraulic actuation and braking systems. The brakes utilize a stiff spring to engage the brake pad and lock the driveshaft. When power is applied, the electromagnet counteracts the spring to disengage the brake. Power may be supplied by battery or an alternative power source, including, but not limited to the rotorcraft's main electrical power system. The motors are used only when leg movement is required and the brakes, in a preferred embodiment, act as a failsafe as the joints will lock in place if power is lost. In a further embodiment, each joint further comprises a gearbox to drive the motor and an output shaft that have been modified to integrate directly into the upper leg segment. In a preferred embodiment, the drive shaft of the hip gearbox runs through the center of the hip joint connecting the upper leg segment and the leg brace. In this preferred embodiment, wherein the gearboxes and knee actuator are integrated into the upper leg segment, high strength precision timing belts are used to allow the knee motor, knee brake and gear box to sit along parallel axes. It is understood that alternative connections from the motor to the gearbox may be used, such as, but not limited to belt, cable, or gear drives. In a preferred embodiment, an absolute encoder is associated with the hip and knee joints to sense the position of each joint, however alternative sensors may be used. It is understood that alternative configurations are possible and dependent upon volume restrictions.

In another embodiment, the lower leg segment is comprised of a durable, lightweight configuration that enables it to fold over the upper segment when fully actuated or while not in use. It is highly preferable that the configuration fold in such a manner as to avoid as much aerodynamic drag as possible when in flight.

In a further embodiment, the foot comprises a solid aluminum inner structure covered with an integrated contact sensor. The contact sensor is a force-sensitive resistor which, in a preferred embodiment is constructed of two layers of conductive material separated by a sensor film that becomes more electrically conductive as pressure is applied such as, but not limited to a polyamide tape, Velostat®, or Linqstat™. The foot is then wrapped with high-strength non-slip rubber. In a preferred embodiment, once the contact sensor of the leg touches a landing surface, the motors are powered to retract the leg on which contact is detected to maintain a certain amount of contact pressure with the surface. Each robotic leg does this independently until contact is detected on the sensors of all of the robotic legs, at which point the legs lock in position and the rotorcraft can safely land.

Other aspects, features, and advantages will become apparent to those skilled in the art from the detailed description and accompanying drawings. It should be understood, however, that the detailed description and accompanying drawings, while indicating preferred embodiments of the present invention, are given by way of illustration and not limitation.

DETAILED DESCRIPTION OF THE INVENTION

Figure 1:
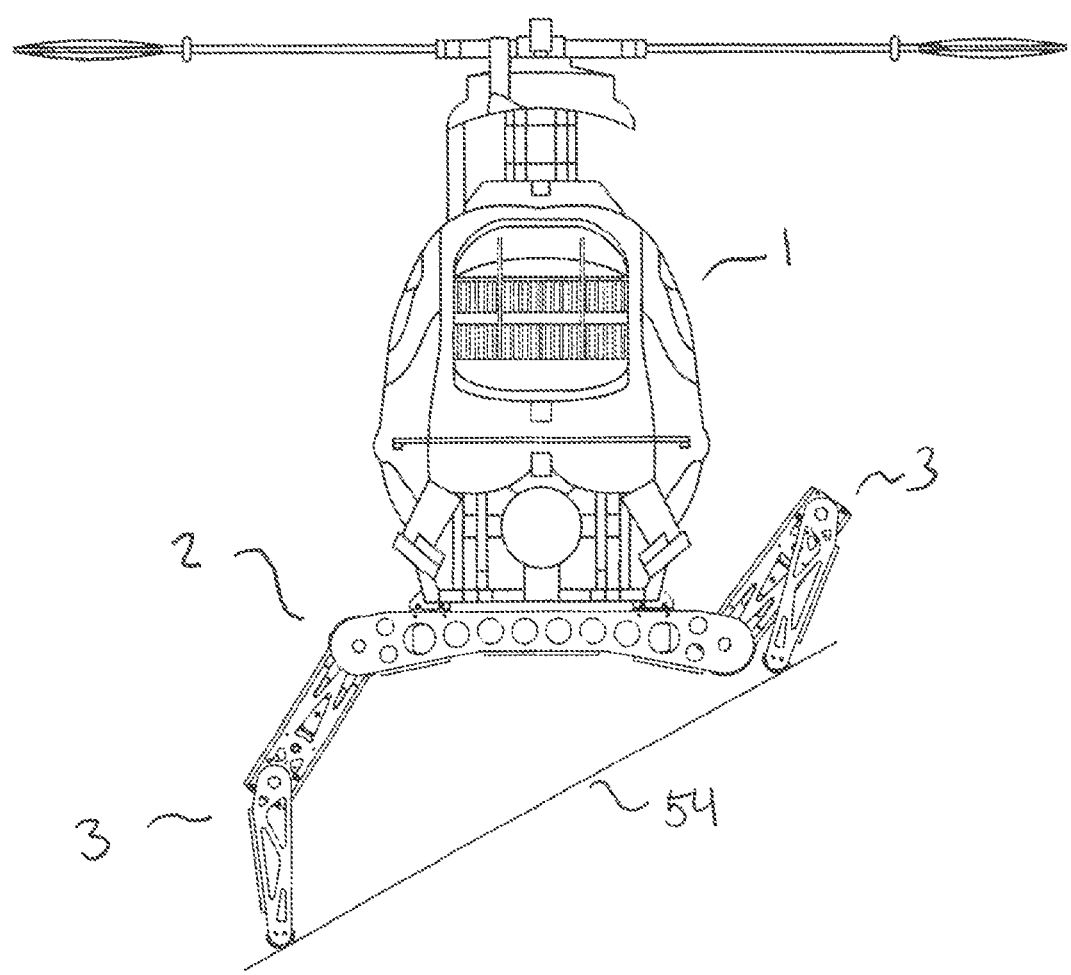
FIG. 1 a schematic representation of the present invention wherein the robotic landing gear has been used to allow a sloped landing for a rotorcraft.

FIG. 1 is a schematic representation of an embodiment of the present invention wherein a rotorcraft 1 has been fitted with robotic landing gear 2 with articulated robotic legs 3 that allow for landing on sloped or uneven surfaces 54.

Figure 2:
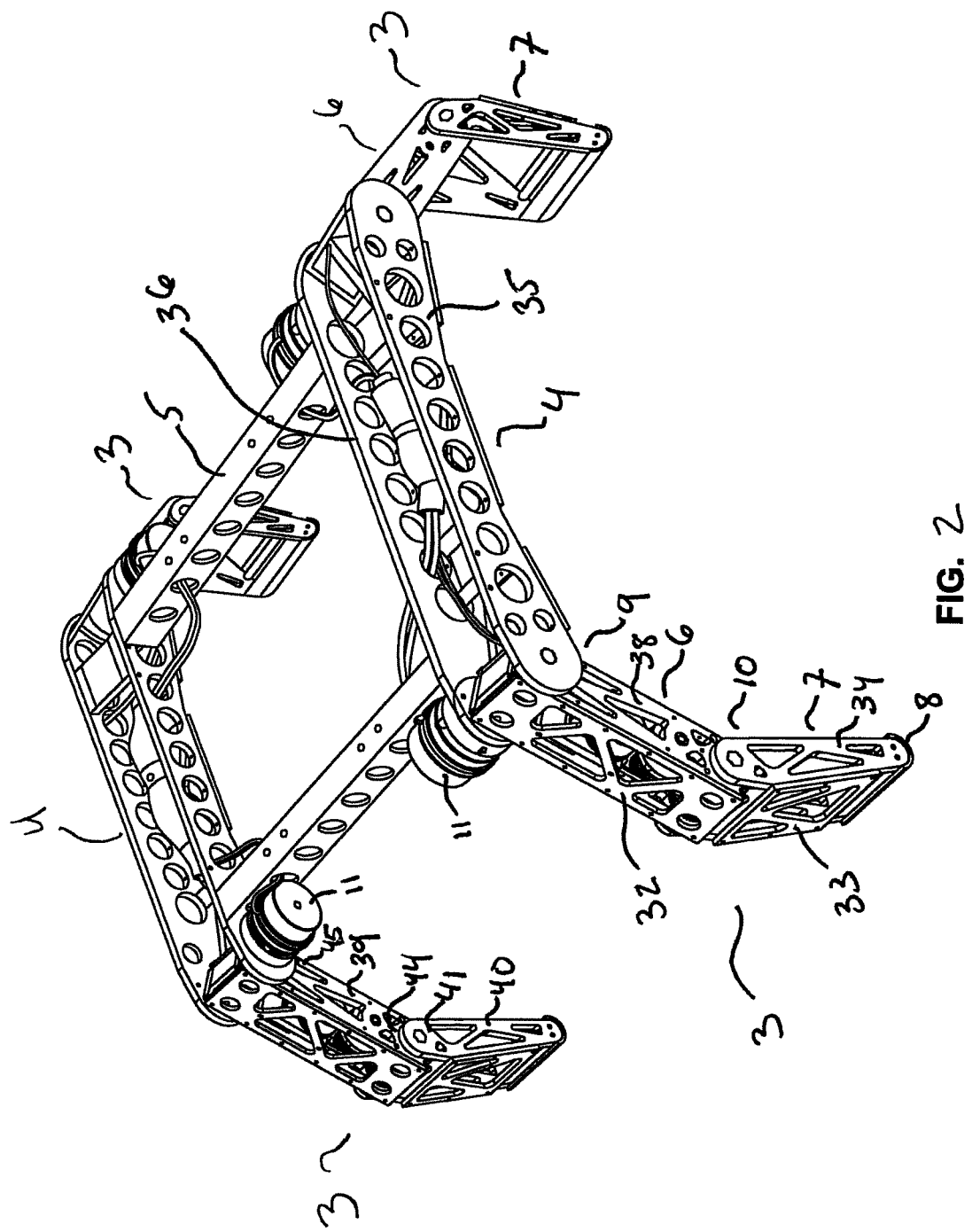
FIG. 2 is a schematic representation of a preferred embodiment of the frame and articulated legs.

FIG. 2 is a schematic representation of an embodiment of the robotic landing gear 2 of the present invention. The robotic landing gear consists of two leg braces 4 attached to two cross braces 5 to form a frame to support the rotorcraft creating an exterior leg brace panel 35 and an interior leg brace panel 36. At the terminus of each end of each leg brace 4, an articulated robotic leg 3 is attached to the leg brace to form hip joint 9. Each articulated robotic leg 3 consists of an upper leg segment 6, a lower leg segment 7 and a foot 8. Each upper leg segment is connected to a lower leg segment by knee joint 10. Each hip joint 9 is driven by a hip motor 11 that is located at the terminus of each leg brace 4 on the interior leg brace panel 36. Each upper leg segment consists of an outer upper leg segment frame 32, an inner upper leg segment frame 37 (not shown), an exterior upper leg segment side panel 38 and an interior upper leg segment side panel 39. Interior upper leg segment side panel 39 consists of interior upper side top 45 and interior upper side bottom 44. Each lower leg segment consists of an outer lower leg segment frame 33, an exterior lower side panel 34 and an interior lower side panel 40.

Figure 3:
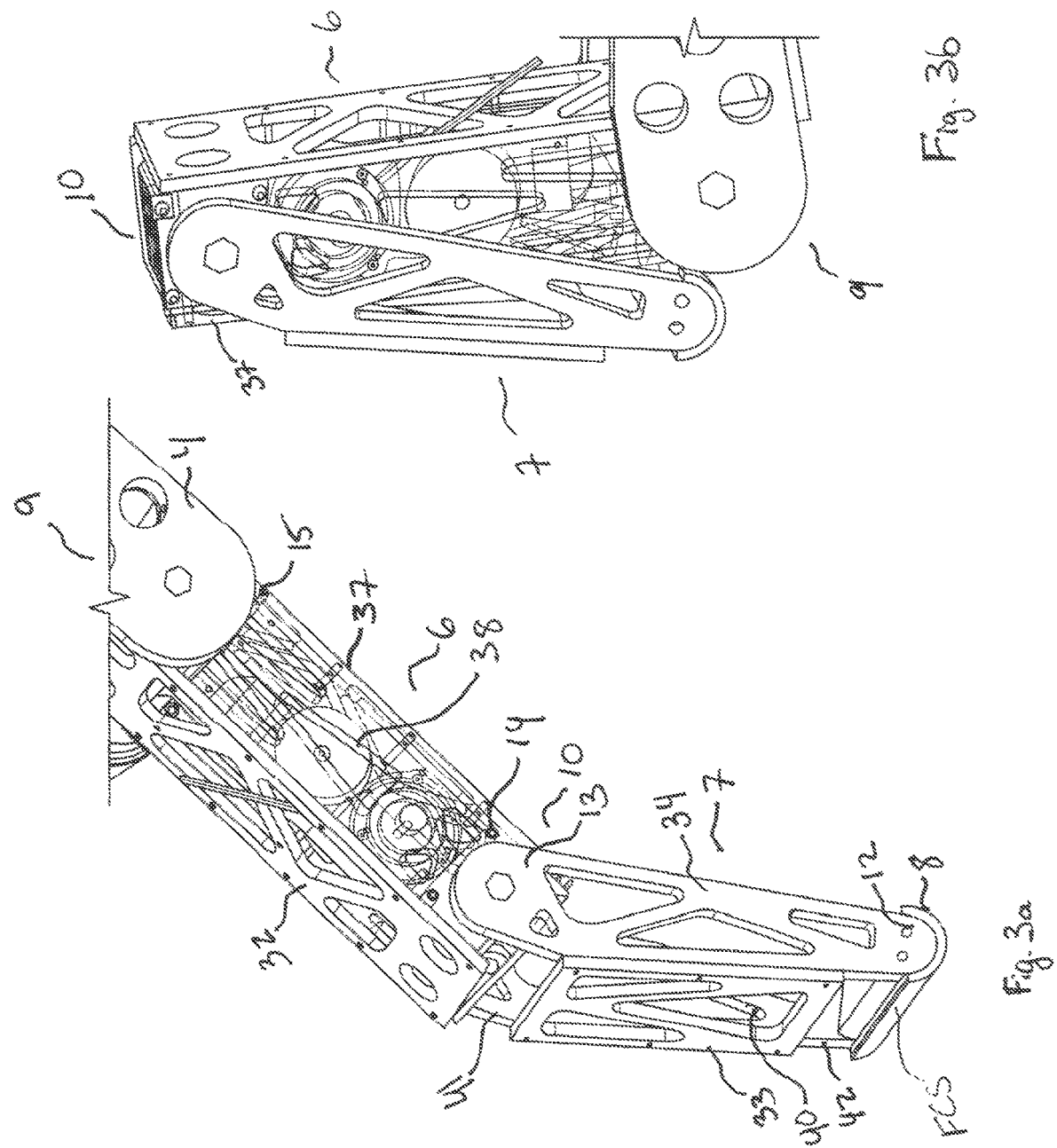
FIGS. 3a and 3b are schematic representations of the present invention wherein the articulated leg has been elongated and where it has been folded while not in use.

FIG. 3a is a schematic representation of a preferred embodiment of the present invention wherein a leg 3 has been extended. Leg 3 consists of upper leg segment 6 and lower leg segment 7. Upper leg segment 6 further consists of an outer upper leg segment frame 32, inner upper leg segment frame 37, exterior upper leg segment side panel 38 and interior upper leg segment side panel 39 (not shown). Exterior upper leg segment side panel 38 consists of exterior upper side top 15 and exterior upper side bottom 14. Interior upper leg segment side panel 39 (not shown) consists of interior upper side top 45 (not shown) and interior upper side bottom 44 (not shown). Lower leg segment 7 consists of outer lower leg segment frame 33, exterior lower side panel 34 consisting of an exterior lower top 13 and an exterior lower bottom 12, an interior lower side panel 40 consisting of an interior lower top 41 and an interior lower bottom 42. Foot 8 is connected to exterior lower side panel 34 at exterior lower bottom 12 and interior lower side panel 40 at interior lower bottom 42. Foot 8 is covered by a foot contact sensor FCS. Upper leg segment 6 is connected to leg brace 4 by hip joint 9 at exterior upper side top 15 and interior upper side top 45 (not shown). Lower leg segment 7 is connected to exterior upper side bottom 14 at exterior lower top 13 and interior upper side bottom 44 (not shown) at interior lower top 41 at knee joint 10.

Figure 4:
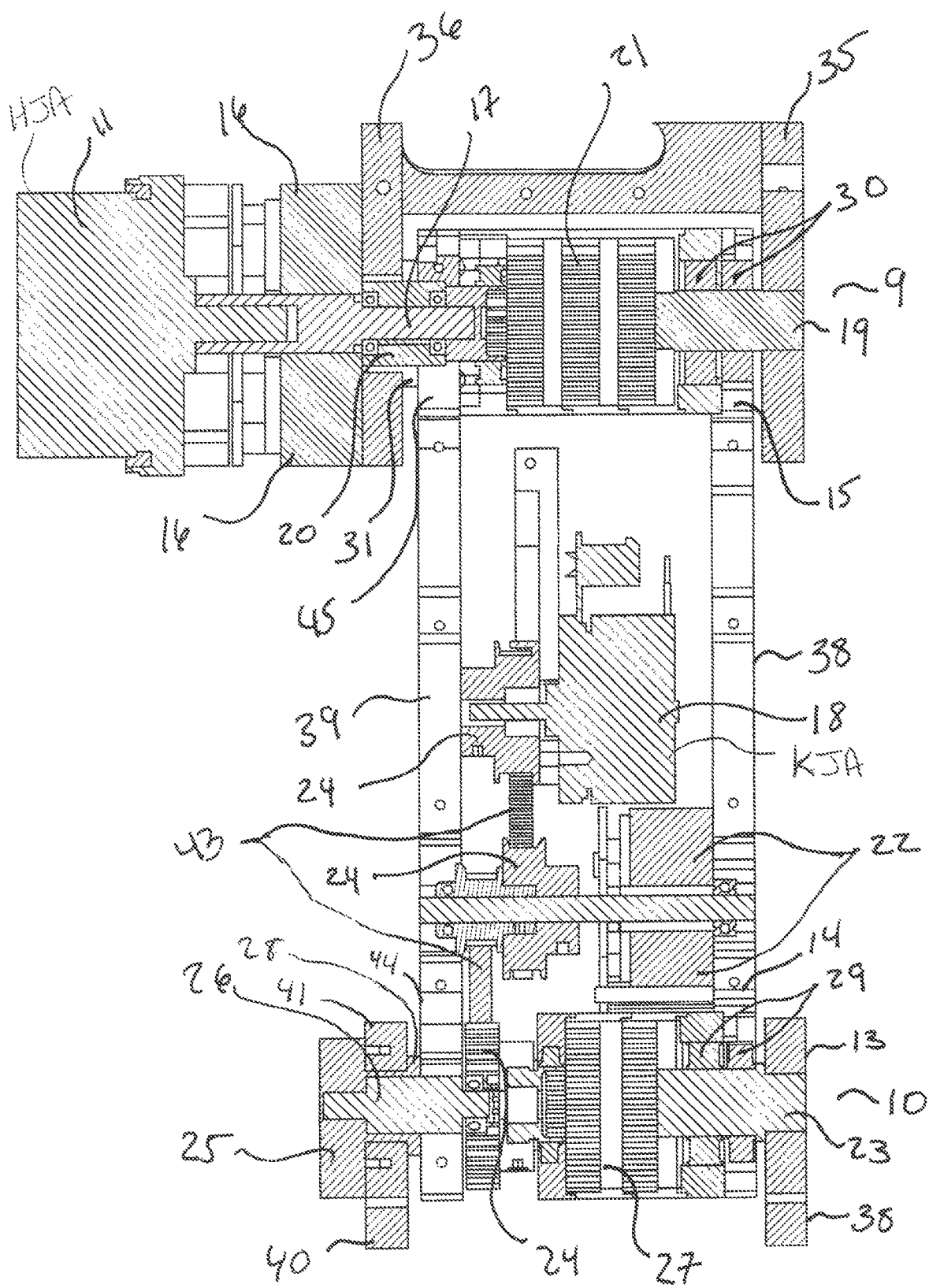
FIG. 4 is a schematic representation of a preferred embodiment of the mechanism of actuation of the articulated legs.

FIG. 4 is a schematic representation of a preferred embodiment of the actuation mechanism of the present invention. The actuation mechanism consists of hip joint 9 and knee joint 10. Hip joint 9 consists of hip joint actuator HJA. In the embodiment of FIG. 4, the hip joint actuator HAJ consists of hip motor 11. Hip joint 9 further consists of hip brake 16, hip drive shaft 17, hip gear box 21, hip joint pin 20, hip joint bushing 31, hip gearbox output shaft 19 and hip gearbox output shaft bearings 30. Hip drive shaft 17 extends from hip motor 11 through interior leg brace panel 36 of leg brace 4 and interior upper side top 45 of interior upper leg segment side panel 39 to hip gear box 21. Hip output shaft 19 extends from hip gear box 21 through exterior upper side top 15 of exterior upper leg segment side panel 38 and is attached to exterior leg brace panel 35 of leg brace 4. Knee joint 10 consists of hip joint actuator KJA. In the embodiment of FIG. 4, the knee joint actuator KJA consists of knee motor 18. Knee joint 10 further consists of knee brake 22, knee gearbox 27, knee gearbox output shaft 23, knee gearbox output shaft bearings 29, knee joint pin 26, knee joint bushing 28, and knee joint absolute encoder 25. Knee output shaft 23 extends from knee gearbox 27 though exterior upper side bottom 14 of exterior upper leg segment side panel 38 and is attached to exterior lower top 13 of exterior lower side panel 34. Knee joint pin 26 extends from knee gearbox 27 through interior upper side bottom 44 of exterior upper leg segment side panel 38 and extends through the interior lower top 41 of interior lower side panel 40. Knee joint absolute encoder 25 is the attached to knee joint pin 26. Timing pulleys 24 and timing belts 43 connect the knee motor 18 to the knee brake 22 and knee gearbox 27.

FIG. 3b is a schematic representation of a preferred embodiment of the present invention wherein leg 3 has been retracted. Hip joint 9 has been actuated to raise upper leg segment 6 and knee joint 10 has been actuated such that lower leg segment 7 rests against inner upper leg segment frame 37.

FIG. 4 is a schematic representation of a preferred embodiment of the actuation mechanism of the present invention. The actuation mechanism consists of hip joint 9 and knee joint 10. Hip joint 9 consists of hip motor 11, hip brake 16, hip drive shaft 17, hip gear box 21, hip joint pin 20, hip joint bushing 31, hip gearbox output shaft 19 and hip gearbox output shaft bearings 30. Hip drive shaft 17 extends from hip motor 11 through interior leg brace panel 36 of leg brace 4 and interior upper side top 45 of interior upper leg segment side panel 39 to hip gear box 21. Hip output shaft 19 extends from hip gear box 21 through exterior upper side top 15 of exterior upper leg segment side panel 38 and is attached to exterior leg brace panel 35 of leg brace 4. Knee joint 10 consists of knee motor 18, knee brake 22, knee gearbox 27, knee gearbox output shaft 23, knee gearbox output shaft bearings 29, knee joint pin 26, knee joint bushing 28, and knee joint absolute encoder 25. Knee output shaft 23 extends from knee gearbox 27 though exterior upper side bottom 14 of exterior upper leg segment side panel 38 and is attached to exterior lower top 13 of exterior lower side panel 34. Knee joint pin 26 extends from knee gearbox 27 through interior upper side bottom 44 of exterior upper leg segment side panel 38 and extends through the interior lower top 41 of interior lower side panel 40. Knee joint absolute encoder 25 is the attached to knee joint pin 26. Timing pulleys 24 and timing belts 43 connect the knee motor 18 to the knee brake 22 and knee gearbox 27.

Figure 5:
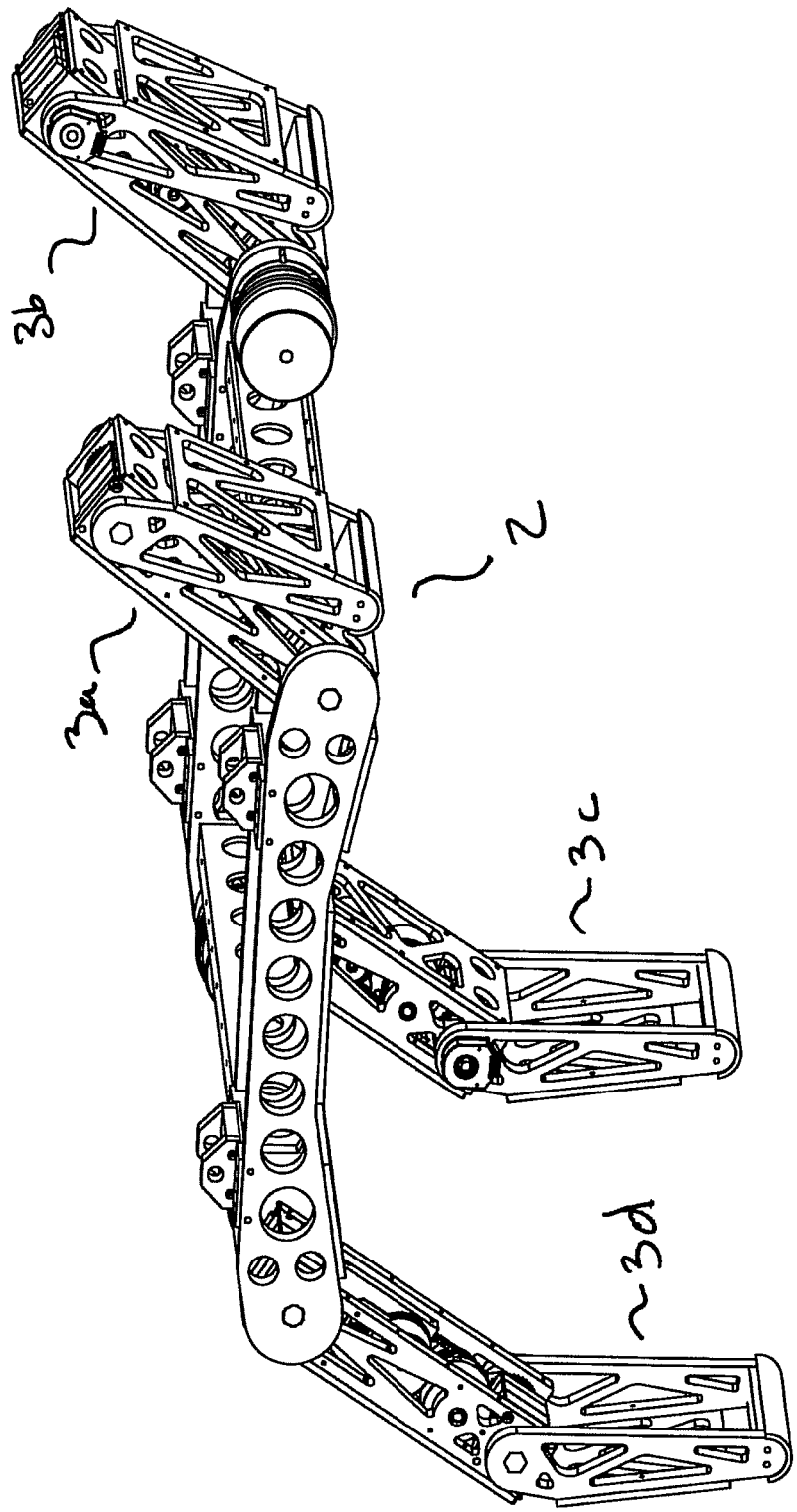
FIG. 5 is a schematic representation of the frame and articulated legs wherein two of the legs have been actuated and two remain in nominal stance.

FIG. 5 is a schematic representation of a preferred embodiment of the present invention wherein two of the legs 3a and 3b of the robotic landing gear 2 have been actuated while two legs 3c and 3d remain in a nominal stance.

We claim:

1. A robotic landing gear apparatus for a rotorcraft for landing the rotorcraft on a surface comprising:
   a plurality of independent articulated robotic legs attached to the rotorcraft wherein each of the articulated robotic legs further comprises:
      an upper leg segment further comprising an upper leg segment top and an upper leg segment bottom, wherein the upper leg segment top is movably attached to the rotorcraft to form a hip joint,
      a hip joint actuator, for moving the upper leg segment in relation to the rotorcraft,
      a means for locking the hip joint, and
      a lower leg segment, wherein the lower leg segment further comprises a lower leg segment moveably attached to the upper leg segment bottom to form a knee joint,
      a knee joint actuator, for moving the lower leg segment and upper leg segment about the knee joint,
      a means for locking the knee joint, and
      a knee joint sensor, wherein the knee joint sensor senses the actuation of the knee joint actuator and motion of the lower leg segment and upper leg segment about the knee joint, and
      a foot attached to the lower leg segment bottom, wherein the foot further comprises a contact sensor.

2. The robotic landing gear apparatus of claim 1 wherein the hip joint actuator is an electric motor connected to the hip joint by means of a hip joint gearbox and the knee joint actuator is an electric motor attached to the knee joint by means of a knee joint gearbox.

3. The robotic landing gear apparatus of claim 1 wherein the means for locking the hip joint is a hip joint power-off brake and the means for locking the knee joint is a knee joint power-off brake.

4. The robotic landing gear apparatus of claim 1 wherein the contact sensor comprises a pressure-sensitive film wherein the pressure-sensitive film is located between at leas to layers of conductive film.

5. The robotic landing gear of claim 1 wherein the knee joint sensor is an absolute encoder.

6. The robotic landing gear of claim 1 wherein when the contact sensor senses contact with the surface, the hip joint actuator and the knee joint actuator actuate to retract the upper leg segment and lower leg segment to maintain contact with the surface.

7. The robotic landing gear of claim 1 wherein the hip joint is a hinge joint.

8. The robotic landing gear of claim 1 wherein the hip joint is a ball and socket joint.

9. A robotic landing gear apparatus for a rotorcraft for landing the rotorcraft on a surface comprising:
   at last three independent articulated robotic legs attached to the rotorcraft wherein each of the at least three articulated robotic legs further comprises:
      an upper leg segment further comprising an upper leg segment top and an upper leg segment bottom, wherein the upper leg segment is movably attached to the rotor craft to form a hip joint,
      a hip joint actuator for moving the upper leg segment in relation to the rotorcraft,
      a means for locking the hip joint,
      a lower leg segment further comprising a lower leg segment top and a lower leg segment bottom, wherein the lower leg segment is movably attached to the upper leg segment to form a knee joint,
      a knee joint actuator for moving the lower leg segment in relation to the upper leg segment,
      a means for locking the knee joint,
      a foot attached to the lower leg segment bottom, wherein the foot further comprises a contact sensor, wherein when the contact sensor senses contact with the surface, the hip joint actuator and the knee joint actuator actuate to retract the upper leg segment and lower leg segment to maintain contact with the surface, and
   wherein the plurality of articulated robotic legs are controlled independent of each other.

10. The robotic landing gear apparatus of claim 9 wherein the hip joint actuator is an electric motor attached to the hip joint by means of a hip joint gearbox and the knee joint actuator is an electric motor attached to the knee joint by means of a knee joint gearbox.

11. The robotic landing gear apparatus of claim 9 wherein the means for locking the hip joint is a hip joint power-off brake and the means for locking the knee joint is a knee joint power-off brake.

12. The robotic landing gear apparatus of claim 9 wherein the contact sensor comprises a pressure-sensitive film wherein the pressure-sensitive film is located between at least two layers of conductive film.

13. The robotic landing gear of claim 9 wherein the knee joint sensor is an absolute encoder.

14. The robotic landing gear of claim 9 wherein the hip joint is a hinge joint.

15. The robotic landing gear of claim 9 wherein the hip joint is a ball and socket joint.

16. The robotic landing gear of claim 9 wherein the contact sensors of each independently articulated leg maintain contact pressure with the surface until each of the contact sensors of each of the independently articulated leg senses the surface.

* * * * *